May 11, 1954 A. C. SCHROEDER 2,678,351
COLOR TELEVISION
Filed Sept. 24, 1949 2 Sheets-Sheet 1

INVENTOR
Alfred C. Schroeder
BY
ATTORNEY

INVENTOR
Alfred C. Schroeder
BY
[signature]
ATTORNEY

Patented May 11, 1954

2,678,351

UNITED STATES PATENT OFFICE 2,678,351

COLOR TELEVISION

Alfred C. Schroeder, Feasterville, Pa., assignor to Radio Corporation of America, a corporation of Delaware Application September 24, 1949, Serial No. 117,593

9 Claims. (Cl. 178—69.5)

This invention relates to color television and more particularly to arrangements for synchronization of color sampling in elemental multiplex color television systems.

Images in their natural color may be transmitted over electrical circuits by analyzing the light from the object being televised not only into its image elements, but by also analyzing the light of the object into selected primary or component colors and developing therefrom an electrical signal train. The image may then be presently reproduced in its natural color at a remote location by appropriately demodulating the signal train and constructing a color image therefrom.

The basic law that a single electrical-transmission circuit can carry but one item of information at a time is of course as true for the transmission of color images as it is true for the transmission of black and white images. For example, if several electrical signals representative of several different selected component colors and covering the same frequency band are applied simultaneously to a single circuit, the corresponding current impulses lose their separate identities in the single circuit and cannot be separated at the receiving end of the circuit. Consequently, such information must be conveyed sequentially or in "single file," unless separate circuits are provided for each of the selected component color representative signals.

Heretofore, the most popular sequential method has been what is commonly called the field sequential method.

In the transmission of color images by the field sequential method, a single pick-up tube such as, for example, the so-called image orthicon is exposed in succession to images giving color separation corresponding to the various selected component colors. During the period the camera tube is exposed to each component color image, the mosiac is concurrently scanned to enable the transmission of signals representing the corresponding color separation image. The proper color separation images may be supplied to the image pick-up tube sequentially by a mechanical arrangement of the rotating filters. The color separation may also be obtained by electronic switching of several differently color sensitive image pick-up tubes in sequence.

In the conventional field sequential multi-color television receiver a kinescope, or other image producing tube is employed to recreate a black and white image likeness which is viewed or projected through a color filter of the selected component color or corresponding to the desired component color instantaneously being represented at the transmitter. The process is then repeated for the next selected color component and so on. The processes are repeated rapidly enough that the several component colors appear simultaneously to the human eye. A typical field sequential color television system is shown and described in an article entitled, "An experimental color television system," beginning on page 141, RCA Review for June 1946.

Although color images have been successfully reproduced by the aforesaid sequential method, there are certain fundamental difficulties involved which tend to reduce the entertainment value of the field sequential system. One serious difficulty involved includes color action fringes resulting from movement between individual component color scannings because of the great amount of time required for the scanning of a complete field.

It becomes apparent that this difficulty for the field sequential method of color image transmission is eliminated if the rate of change between the selected color components is made rapidly enough to overcome any indication of movement between the different selected component color representations.

If, for example, "elemental" sequential rate is employed, that is, if each small image area or image element is divided into three separate component colors and for each elemental area of the image there is transmitted sequentially three different color representations, each of whose magnitude or energy depends upon the selected component colors of the image element, no difficulty will be experienced with color action fringes.

It at once becomes apparent, however, that such a method and arrangement would require not only accurate synchronism in the scanning raster, but it would require also an accurate synchronism or speed control in each traverse of the scanning element in order that corresponding color representation at both the transmitter and receiver would be scanned in perfect synchronism.

It has been proposed in this connection to provide a sampling oscillator or other signal generating device having a frequency much greater than the horizontal scanning frequency. The oscillator at the receiver is synchronized with the oscillator at the transmitter by utilizing the standard horizontal synchronizing pulses to control the phase of the sampling oscillator. The output signal of this controlled oscillator is employed to sequentially switch at an elemental sequential rate the several different component color cathode ray beam tubes or other selected component color image devices in phase and in synchronism at the transmitter end receiver.

Such an arrangement is well shown and described in the copending U. S. application of John Evans, Serial No. 111,384, entitled "Color Television," filed August 20, 1949.

It has been discovered that improved detail and less flicker may be obtained with the dot multiplex or elemental sequential arrangement by employing what is called horizontal interlace. Horizontal interlace refers to the laying down of different colored dots along the same line at different positions in successive scans of the same line. Electrically, this is accomplished by shifting the phase of the sampling pulses the next time that the same line is scanned so that the dots are then laid down between the dots that were laid down in the first scan.

It will be remembered that while a single line scan lays down a series of green dots, for example, on the screen with space between dots, this space is completely filled at the same time by red and blue dots, with great overlapping of the dots.

During the first scanning field, for example, the odd numbered lines are scanned in order. That is, the three colored dots are laid down in order along line one. Next, line three is scanned with a displacement of 180 degrees for each color. That is, each dot of like color is positioned in a vertical direction between dots of the same color in the preceding scan line. The remaining odd lines are scanned in order with the color dot pattern referred to immediately above. This scanning of the first field takes place in one-sixtieth of a second. During the second field, the even lines are scanned, first line two with the colors laid down in overlapping dots, then line four and so on. The dot pattern laid down during the third field is displaced in each line 180 degrees from the position of like colors in the previous scanning of the same line. During the fourth field, the even lines are likewise scanned with a 180 degree displacement from the previous scanning of the same line.

Thus the odd lines are scanned during the first field, but dots of the same primary color are separated by spaces. The even lines are scanned during the second field, again with spaces between like color dots. During the third field, the odd lines are again scanned but with the color dots displaced so that the spaces are filled. The even lines are scanned during the fourth field, with the color dots displaced to fill in the spaces left during the second field scanning. Four scanning fields are required to completely cover the image area, with all spaces filled, with say, green dots. Simultaneously, however the area is being covered with red dots and with blue dots.

There are sixty fields per second, so it may be said that there are fifteen complete color images per second. It should be remembered that the effective field rate for large-area flicker is sixty per second, the same as for current black and white receivers. At viewing distances such that the picture line structure is not resolved, the effect of small area flicker due to line interlace and horizontal interlace is not visible.

A system of dot or element interlace has been very well shown and described in the co-pending U. S. application to Randall Ballard, Serial No. 117,528, entitled System of Color Television, filed September 24, 1949.

It will at once become apparent that in order to provide for the dot interlace described immediately above, it is necessary to not only control the sampling oscillator in synchronism with the sampling oscillator at the transmitter, but also it is necessary that the phase of the sampling oscillators be changed with each line. Various arrangements have been proposed for controlling and changing the phase with each line by employment of special arrangements, including the transmission of sampling oscillator control frequency or alternate switching arrangements included in the receiving circuit.

According to this invention, the sampling oscillator in both the receiver and transmitter is controlled for proper timing and change of phase from line to line by changing the relative positions of the trailing edge of alternate horizontal synchronizing pulses in order that the sampling oscillator phase will be correct to establish horizontal interlace.

The primary objective of this invention is to provide for improved color television.

Another object of this invention is to provide an economical and reliable arrangement for the transmission of synchronizing information relating to phasing of sampling oscillators in the elemental or dot multiplexing type of color television systems.

Still another object of this invention is to conveniently modify the presently standard synchronizing signals to permit the operation of elemental multiplex color television receivers.

Still another object of the invention is to so modify the presently standard synchronizing pulses that they will be satisfactory for both the present black and white television receivers as well as the elemental multiplex color television receivers.

Other and incidental objects of the invention will become apparent to one skilled in the art upon a reading of the following specification considered in connection with the accompanying drawings in which.

Figure 1:
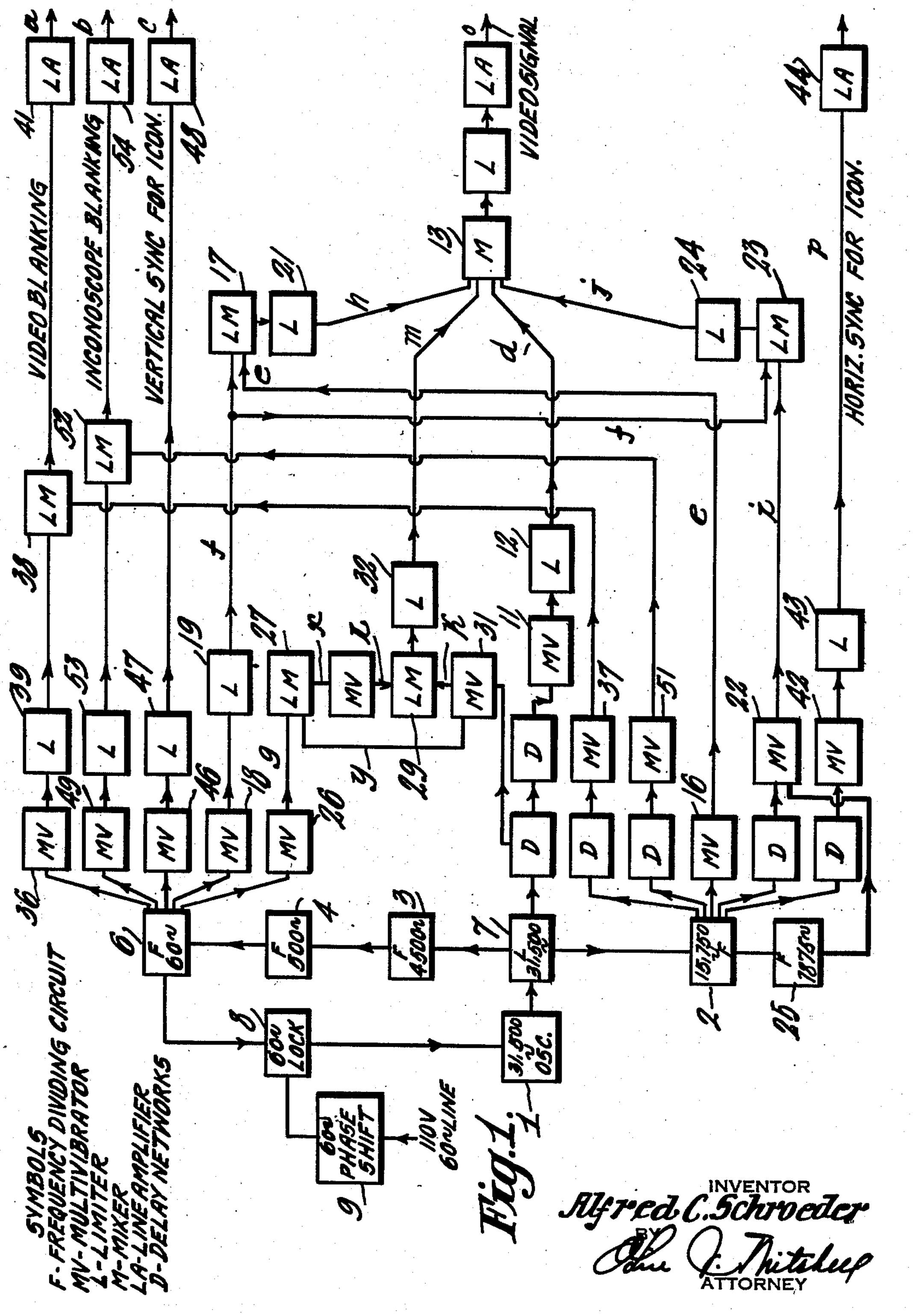
Figure 1 illustrates by block diagram a synchronizing signal generator in which the present invention is employed to provide for proper timing of a sampling oscillator in an elemental multiplex color television system.

Turning now in more detail to Figure 1 there has been selected a basic type of synchronizing signal generator for the provision of the necessary timing and waveforms for furnishing scanning beam deflection information.

The control of the scanning beam in its horizontal and vertical deflection directions has been very adequately covered in prior publications relating to television. It is not intended at this time, therefore, to explain in detail the various arrangements for producing synchronization at both the transmitter and receiver. It is important, however, for a proper understanding of the present invention that the operation of a typical synchronizing signal generator be briefly described.

Although it is not intended that the present invention should be limited to a synchronizing signal generator of any particular form, there has been selected, for the purpose of illustration and explanation of the operation of this invention, a synchronizing signal generator of a type used in present day television stations.

The synchronizing signal generator illustrated in Figure 1 takes the form of a synchronizing generator such as shown and described in detail in the United States patent to Alda V. Bedford, No. 2,258,943, patented August 14, 1941.

For the convenience in the understanding of the present invention, the modification to the synchronizing signal generator referred to is set out in heavier lines in the drawing of Figure 1 and may be found in the lower left hand corner of the figure.

The desired whole number plus one-half relation between the scanning line frequency and the frame frequency is obtained by utilizing a main or master oscillator 1 operating at double the line frequency. In this particular case the double line frequency of 31,500 cycles per second is divided by two by means of a frequency divider 2 in order to produce the horizontal deflecting or line scanning frequency of 15,750 cycles per second and by dividing the double frequency by odd numbers by means of frequency dividers 3, 4 and 6 to produce the vertical deflecting or frame frequency of 60 cycles per second. This method of obtaining the synchronizing impulses for interlaced scanning is described in British Patent 434,469, issued September 2, 1935.

Since the oscillator 1 is a sine wave oscillator its output is passed through a limiter or clipper circuit 7 for the purpose of producing rectangular impulses, these impulses being impressed upon the frequency dividers.

The main oscillator 1 from which the horizontal and vertical synchronizing impulses are derived is locked in with the 60 cycle power line by means of a suitable lock-in circuit indicated by block 8 to which is supplied 60 cycle impulses from frequency divider 6 and sine wave voltage from the 60 cycle power line, the sine wave voltage passing through a phase shifter 9 determines the phase relation of the synchronizing impulses with respect to the power line supply if desired.

The generator of Figure 1 produces five separate signals as follows:

First, and of the most interest, the scanning synchronizing signal which is to be transmitted to the receiver, second, the blanking signals which are to be transmitted to the receiver along with the picture signals and the synchronizing signals, third, the horizontal synchronizing or driving impulses for the transmitter pick-up tube, fourth, the vertical synchronizing or driving impulses for the transmitter pick-up tube and fifth, the transmitter tube blanking impulses.

The present invention relates primarily to the production of the synchronizing signals which are transmitted to the receiver.

The one-half line width or double frequency impulses provided by oscillator 1 and limiter circuit 7 are the basic signals upon which the whole synchronizing signal train is built. More specifically the front edges of the 31,500 cycle per second impulses corresponds to the front edges of all the impulses comprising the final composite synchronizing signal shown in Figure 2.

The 31,500 cycle per second impulses are obtained by taking impulses from the limiter circuit 7, delaying them a suitable amount by a delay network D to make the front edges of the impulses start at the proper time, impressing them upon a multivibrator 11 which may be adjusted to make the impulses of the proper width, passing the resulting impulses through a limiter or clipping circuit 12 which supplies the final impulses to a mixing portion of the circuit indicated at 13.

Circuit details which are not important to the present invention will be omitted in the interest of clarity. Circuit details may be obtained by reference to the aforementioned Bedford Patent 2,258,943.

Certain portions of the double line frequency impulses are not desired. The blanking of the undesired pulses is obtained by taking impulses from a 15,750 cycle per second multivibrator 16 which feeds into limiter-mixer circuit 17. To eliminate the impulses obtained from the multivibrator 16 for the period during which the double frequency impulses are desired, 60 cycle impulses are also fed into the limiter-mixer 17, the 60 cycle impulses being taken from a multivibrator 18 through a limiter circuit 19.

Certain pulses must be of double width. Such double width pulses are obtained by taking 15,750 cycle per second impulses from multivibrator 22 which is driven by the frequency divider 2 through a delay circuit D, the delay circuit determining the time the front edges of the impulses start and the adjustment of multivibrator 22 determining the width of the impulses. The 15,750 cycle per second impulses from multivibrator 22 are fed into a limiter-mixer circuit 23 together with the 60 cycle impulses. The desired signal appears in the output of limiter 24 following the mixer 23.

Figure 3:
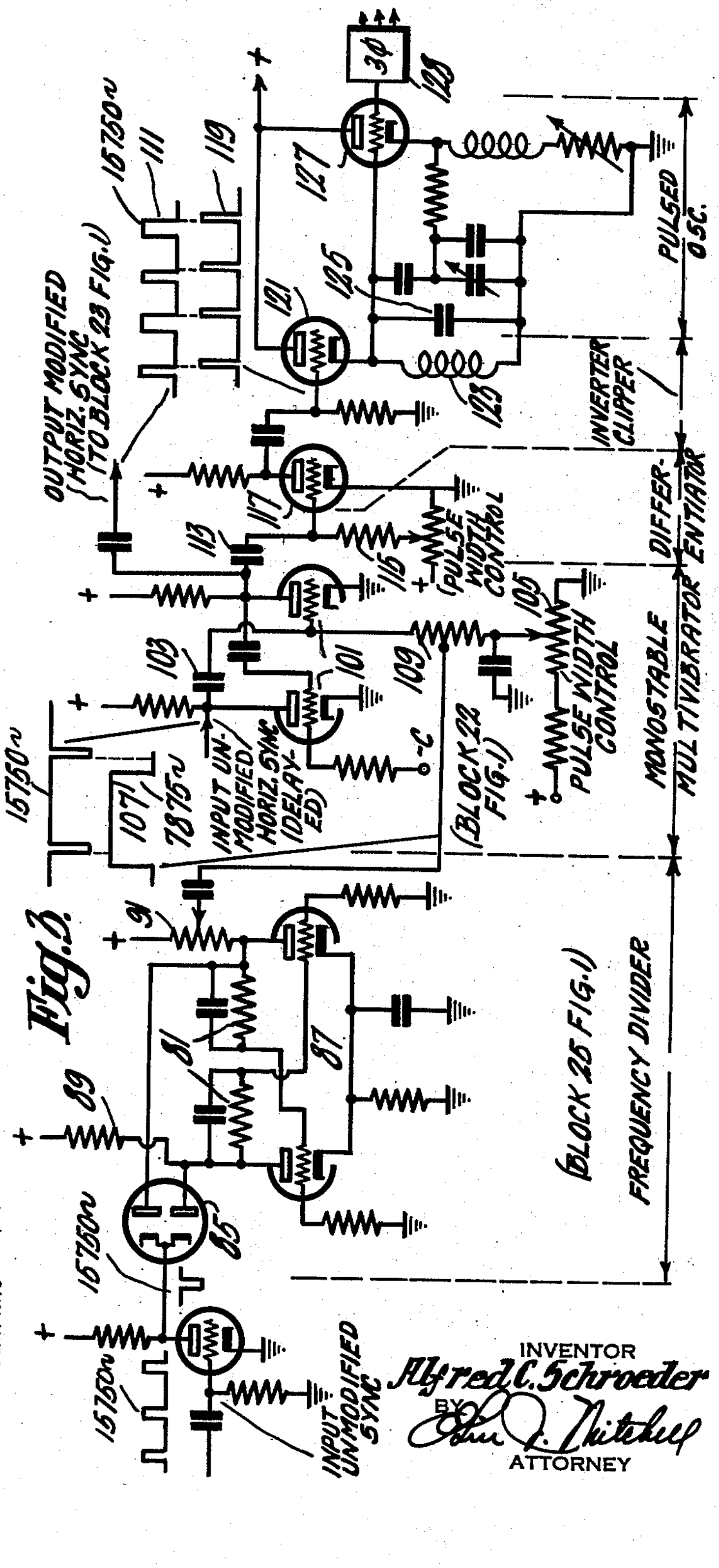
Figure 3 shows by circuit diagram, details of one form of the present invention.

In accordance with the present invention alternate horizontal pulses must have a delayed trailing edge. Accomplishment of this includes dividing the 15,750 cycle per second signal of frequency divider 2, by two in frequency divider 25. The output signal of frequency divider 25 is a square wave having a frequency of 7,875 cycles per second. This 7,875 cycle per second signal is employed to control the width of the pulses generated by multivibrator 22. That is, alternate pulses produced by multivibrator 22 are made longer in time duration. The circuit details are shown in Figure 3.

By mixing the sixty cycle impulses derived from a multivibrator 26 and the 31,500 cycle impulses taken from the limiter 7, a series of impulses may be obtained to produce the slotted vertical synchronizing impulses.

Multivibrator 26 is adjusted to control the start of the slotted impulses by producing impulses which have such width that the back edge occurs just before the slotted impulse is to start. The impulses produced by multivibrator 26 are supplied to limiter-mixer 27, together with 31,500 cycle per second impulses from a multivibrator 31, whereby a selected 31,500 cycle impulse is caused to trigger off a 60 cycle signal near the back edge of each impulse produced by multivibrator 26. In the output circuit of multivibrator 28 there appears the delayed impulses which are fed into a limiter-mixer 29.

There is also fed into the limiter-mixer 29 the 31,500 cycle impulses whose width is determined by multivibrator 31 which is in turn driven through delay circuits D from the limiter 7.

The final signal then appears in the output of a limiter 32 following the limiter-mixer 29.

The video blanking signal is a mixture of 60 cycle impulses produced by a multivibrator 36 and 15,750 cycle impulses produced by a multivibrator 37. The two groups of impulses are supplied to a limiter mixer circluit 38, the 60 cycle impulses first passing through a limiter 39. The final signal appears at line amplifier 41.

The image pick-up tube horizontal driving impulses are obtained from a multivibrator 42 through a limiter or clipper tube 43. The final signal appears at line amplifier 44.

The image pick-up tube vertical driving impulses are obtained from a 60 cycle multivibrator 46 through a limiter circuit 47, the final signal appearing in the output circuit of line amplifier 48.

The image pick-up tube blanking impulses are obtained from a 60 cycle multivibrator 49 and a 15,750 cycle multivibrator 51. The outputs of these multivibrators being supplied to a limiter-mixer circuit 52, and the 60 cycle signal first passing through limiter 53. The final signal appears in the output circuit of a line amplifier 54.

Figure 2:
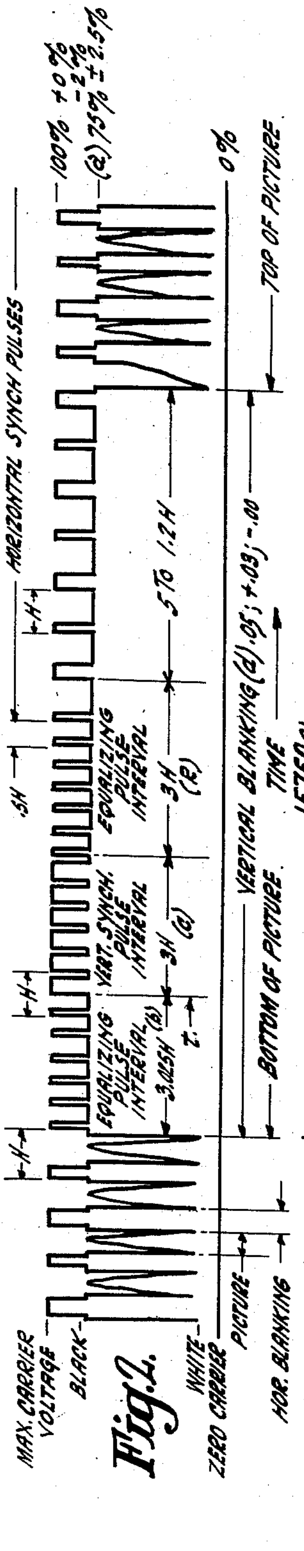
Figure 2 illustrates graphically a synchronizing signal train suitable for employment in the transmission of horizontal interlace type color television signals.

Turning now in more detail to Figure 2, there is shown a composite synchronizing signal provided in accordance with this invention. It is important to notice that alternate horizontal synchronizing pulses are wider. The alternate synchronzing pulses have been widened by adding to the trailing edge but not interfering with the leading edge. The difference has been emphasized in the drawing in the interest of clarity. The amount added to the trailing edge is governed by the phase displacement of the dots from one line to the next. It will also be seen that the change in width of alternate pulses is not effective in the signal train during vertical deflection. The continuation of the proper timing from one field to the next is of course important. This important action is accomplished by the arrangement provided in Figure 3.

Turning now in more detail to Figure 3, there is shown in detail the elements necessary for the practice of this invention in one of its forms.

A multivibrator with two stable states of condition is quite well known to the electrical art and may be employed as a sequence-operated scale-of-two counter circuit. This type of circuit is perhaps the most frequently employed counter circuit because of its reliability and simplicity.

A basic scale-of-two counting circuit is shown by way of example in Figure 3. The pulses to be counted are applied to both sections of tube 87 but only one section can conduct at a time because of the interconnection between sections by resistances 81. Each time a trigger pulse is applied, the conducting and nonconducting sections of tube 87 are interchanged. This action is brought about by applying a negative pulse to the cathode of dual diode tube 85. The circuit is so arranged that the conducting section of the double triode 87 will be cut off and regeneration initiated. This results in a rectangular waveform of half the input signal frequency at the plate of either tube. This output may be used directly to control the width of the pulses of multivibrator 101.

The multivibrator tube 101, including two sections of a triode for purposes of illustration, is of the monostable type. It is essentially a two-stage resistance-capacitance-coupled amplifier with one tube section cut off and the other normally conducting. In the balanced condition of the circuit the second section of tube 101 is normally in a conducting state. This results from the fact that a negative bias is applied to the first section while a positive bias is applied to the control electrode of the second section.

For the purpose of a description of the operation of the circuit involving the multivibrator 101, let it be assumed that the second section of tube 101 is conducting.

Upon the arrival of a negative pulse at the anode connection of the first section, a negative pulse is applied to the control electrode of the second section through condenser 103. This negative pulse to the control electrode of the second section of tube 101 causes the second section to stop drawing current and be cut off. In accordance with the well known operation of multivibrators, the potential of the anode of the second section then raises to a more positive value, causing the control electrode of the first section of tube 101 to also go in a positive direction. This results in a change of the conduction from the second section to the first section. In accordance with the well known operation of multivibrators there is produced in the output circuits a series of pulses which is timed in accordance with the input pulses applied to the anode of the first section of tube 101. In normal operation, the pulses in the output of the second section of tube 101 would be of constant width controlled manually by the potentiometer 105.

In accordance with the present invention, however, it is necessary to obtain pulses alternate ones of which are of different width. In other words, it is necessary in accordance with the present invention to provide a train of signal pulses alternate ones of which have later trailing edges.

This is accomplished by applying the incoming square wave signal 107, obtained from tube 87, to the biasing resistance 109 in such a manner that it will change the bias applied to the control electrode of the second section of tube 101 on alternate horizontal pulses.

For example, if the condition of bias on the second section of tube 101 is at the more positive portion of the curve 107, the potential of the control electrode of the second section of the tube 101 will more quickly reach a value permitting the second section to conduct after it has been turned off by the first section. It will be seen that the width of the output pulse of tube 101 will be dependent upon the time it takes for the charge on the condenser 103 to change and permit second section of tube 101 to again conduct.

If, however, the potential applied to the grid resistance 109 by tube 87 is on the negative portion of the curve 107, it will take longer for the charge on the condenser 103 to change back to the state at which the second section of tube 101 will become conductive.

It will therefore be seen that the width of all the pulses may be controlled by adjusting potentiometer 105, while the width of alternate pulses may be controlled by adjusting potentiometer 91.

The unmodified horizontal synchronizing pulse applied to the first section of tube 101 may be obtained from the delay network connected to the frequency dividing circuit, illustrated in Figure 1 by block 2.

The voltage waveform 107 applied to potentiometer 109 is obtained from the frequency dividing circuit involving tube 87 which also is illustrated by block 25 in Figure 1 of the drawing.

The series of modified horizontal synchronizing signals may then be applied to the limiter mixer represented by block 23 of Figure 1. The output voltage curve is illustrated graphically as curve 111 in Figure 3 to be combined in mixer 13 of the synchronizing signal generator illustrated in Figure 1.

It is important, however, for the proper operation of the present invention that the modified horizontal synchronizing pulses be not only employed in the synchronizing signal generator for transmission to the receiver, but the same modified horizontal synchronizing pulses be employed in the transmitter circuit for synchronizing the sampling devices at the transmitter in accordance with the overall procedure outlined in the co-pending applications of John Evans and Randall Ballard, referred to above.

In this particular form of the invention the modified horizontal synchronizing signal as illustrated by curve 111 is differentiated in a condenser resistance circuit involving condenser 113 and resistance 115. Tube 117 is given a positive bias on the control electrode and functions as a clipper and an inverter circuit. The output signal of tube 117 is illustrated graphically by curve 119.

It is important to notice that the front edges of the pulses of curve 119 correspond to the trailing edge of the pulses in curve 111. It is also important to notice that the width of the pulses in curve 119 are constant, while their spacing is irregular. The amount of difference in spacing is chosen in order to properly interlace the sampling times in accordance with the proposals outlined in detail in the aforementioned Ballard application. This amount of time may, for example, amount to half of the time between one color sampling in order to provide for the proper horizontal interlace. The signal taking the form of the pulses having irregular spacing but constant width, is applied to the control electrode of tube 121 whose plate is connected to a positive potential, and whose cathode is connected to coil 123 which is the tank coil of the ringing circuit involving coil 123 and condenser 125.

In accordance with the teachings of Ballard and Evans whose co-pending applications are referred to above, the pulsed oscillator or ringing circuit must maintain its oscillation of sampling energy at a constant amplitude in order to sample along the width of an entire line. This maintenance of oscillation is caused by the regeneration of tube 127 which is adjusted to prevent decay of the oscillations in the ringing circuit.

Means for obtaining three phase output signals from the ringing circuit are connected to the ringing circuit as illustrated by block 128. The several output signals of block 128 are employed for sampling the several selected component colors in time multiplex.

Although the circuit arrangement illustrated is directed primarily for employment in the transmitting station the elements including the differentiator, inverter, clipper pulsed oscillator and means for producing three phase output signals may be employed in the receiver to convert the modified horizontal synchronizing pulses to produce sampling information for the reproduction of images in their natural color.

Having thus described the invention what is claimed is:

1. A synchronizing system comprising in combination a monostable multivibrator having a synchronizing input circuit and a control terminal, said monostable multivibrator having a pulse duration dependent upon the control voltage applied to said control terminal, a source of pulses of a predetermined frequency, a source of substantially square waves, said square waves having a frequency one half the frequency of the pulses of said source of pulses, means of applying said pulses to said synchronizing input circuit, and means for applying said square waves to said control terminal.

2. A synchronizing circuit comprising a source of synchronizing pulses, a frequency divider having an input and output circuit, said frequency divider input circuit connected to said source of synchronizing pulses, a monostable multivibrator having a synchronizing input circuit and a control terminal, said monostable multivibrator having a pulse duration dependent upon the control voltage applied to said control terminal, a connection between said source of synchronizing pulses and said synchronizing input circuit, and a connection between said frequency divider output circuit and said control terminal.

3. In a color television synchronizing circuit, a horizontal interlace phasing circuit comprising in combination a monostable multivibrator having a synchronizing input and a control terminal, said monostable multivibrator having a pulse duration dependent upon the control voltage applied to said control terminal, means for applying pulses to said synchronizing input circuit, and means for applying the same potential to said control terminal only during alternate pulses.

4. In a color television synchronizing circuit, a horizontal interlace phasing circuit comprising in combination a monostable multivibrator having a synchronizing input circuit and a control terminal, said monostable multivibrator having a pulse duration dependent upon the control voltage applied to said control terminal, a source of line deflection synchronizing pulses, a frequency halver to produce a square wave, means for applying said pulses to said synchronizing input circuit, and a connection between said frequency halver and said control terminal.

5. A monostable multivibrator having a synchronizing input circuit and a control terminal, said multivibrator also having an output circuit, said monostable vibrator having a pulse duration dependent upon the control voltage applied to said control terminal, a differentiator, said differentiator connected to said multivibrator output circuit, a source of pulses of a predetermined frequency, a substantially square wave source, said square wave source having a frequency one half the frequency of the pulses of said source of pulses, means for applying said pulses to said synchronizing input circuit, and means for applying said square waves to said control terminal.

6. In a color television synchronizing circuit, a horizontal interlace phasing circuit comprising a multivibrator having a synchronizing input circuit and a control terminal, said multivibrator having a pulse duration dependent upon the control voltage applied to said control terminal, a source of line deflection synchronizing pulses, a source of substantially square waves, said square waves having a frequency one half the frequency of the pulses of said source of pulses, means for applying said pulses to said synchronizing input circuit, and means for applying said square waves to said control terminal.

7. A synchronizing circuit comprising in combination means for developng horizontal deflection synchronizing pulses, a monostable multivibrator having a synchronizing input circuit and a control terminal, said monostable multivibrator having a pulse duration dependent upon the control voltage applied to said control terminal, means for applying said pulses to said synchronizing input circuit, and means for applying the same potential to said control terminal only during alternate pulses.

8. Apparatus for providing color interlace information comprising in combination synchronizing signal generating means for developing a train of horizontal synchronizing pulses, means for providing an interlace designating signal and means for inserting said interlace designating signal in said train of horizontal synchronizing pulses immediately following the pulses of said train of horizontal synchronizing pulses thereby to provide interlace information.

9. Apparatus for providing color interlace information comprising in combination synchronizing signal generating means for developing a train of horizontal synchronizing pulses, means for providing an interlace designating signal, and means for inserting said interlace designating signal in said train of horizontal synchronizing pulses immediately following the pulses of said train of horizontal synchronizing pulses, said interlace designating signal particularly characterized in that the interlace designating signal following alternate horizontal pulses are similar and the interlace designating signal following adjacent of said synchronizing pulses are dissimilar.

References Cited in the file of this patent

UNITED STATES PATENTS

| Number | Name | Date |
|---|---|---|
| 2,258,943 | Bedford | Oct. 14, 1941 |
| 2,363,809 | Schade | Nov. 28, 1944 |
| 2,546,972 | Chatterjea | Apr. 3, 1951 |